United States Patent [19]
McDermott

[11] Patent Number: 6,045,691
[45] Date of Patent: Apr. 4, 2000

[54] SEWER ECO-COLLAR FOR OPENING WITH COVERS

[76] Inventor: Holly S McDermott, P.O. Box 2311, Coppell, Tex. 75019

[21] Appl. No.: 09/137,940

[22] Filed: Aug. 21, 1998

[51] Int. Cl.$^7$ .................................................. E03F 5/06
[52] U.S. Cl. ......................... 210/164; 210/483; 210/495; 210/502.1; 404/4
[58] Field of Search .................................. 210/163–166, 210/232, 459, 483, 488, 495, 502.1, 691, 693, 908, 924; 404/2, 4, 5; 405/52, 60

[56] References Cited

U.S. PATENT DOCUMENTS

| | | |
|---|---|---|
| 4,136,010 | 1/1979 | Pilie et al. . |
| 4,174,183 | 11/1979 | Ferns . |
| 4,188,151 | 2/1980 | Hall . |
| 4,419,232 | 12/1983 | Arntyr et al. . |
| 5,037,541 | 8/1991 | Ruey-Jang et al. . |
| 5,133,619 | 7/1992 | Murfae et al. . |
| 5,511,904 | 4/1996 | Van Egmond . |
| 5,595,027 | 1/1997 | Vail . |
| 5,632,889 | 5/1997 | Tharp . |
| 5,720,574 | 2/1998 | Barella . |
| 5,820,762 | 10/1998 | Bamer et al. . |
| 5,948,250 | 9/1999 | Middleton . |

*Primary Examiner*—David A. Simmons
*Assistant Examiner*—Fred Prince

[57] ABSTRACT

A apparatus for use in storm water openings equipped with a cover and openings that allow storm water into the storm sewer. The apparatus includes a plurality of troughs with a bottom and two sides that define the troughs. The troughs support an absorbent sock and directs storm water to openings between the troughs where the storm water discharges into a semi-permeable bag prior to discharge down the storm sewer. The troughs are equipped with small openings at each end and on each side of the trough with the purpose of holding a semi-permeable bag between two troughs. The structure, absorbent sock and semi-permeable bag are located on the peripheral portion of the storm sewer inlet. The structure is installed on the same support for the cover by a thin lip and the cover is placed on top of the lip. The absorbent sock provides the first stage of treatment of the storm water. The semi-permeable bags are inserted between the troughs and act as the second stage of treatment and have the dual purpose of allowing the water to flow through to filter out particulate matter and allowing storm water to collect within and fill up the bag thus enabling lighter fractions within the storm water such as oils and grease to float to the top of the bag and contact the absorbent prior to discharge. The apparatus can also be modified for catch basins without a cover.

3 Claims, 3 Drawing Sheets

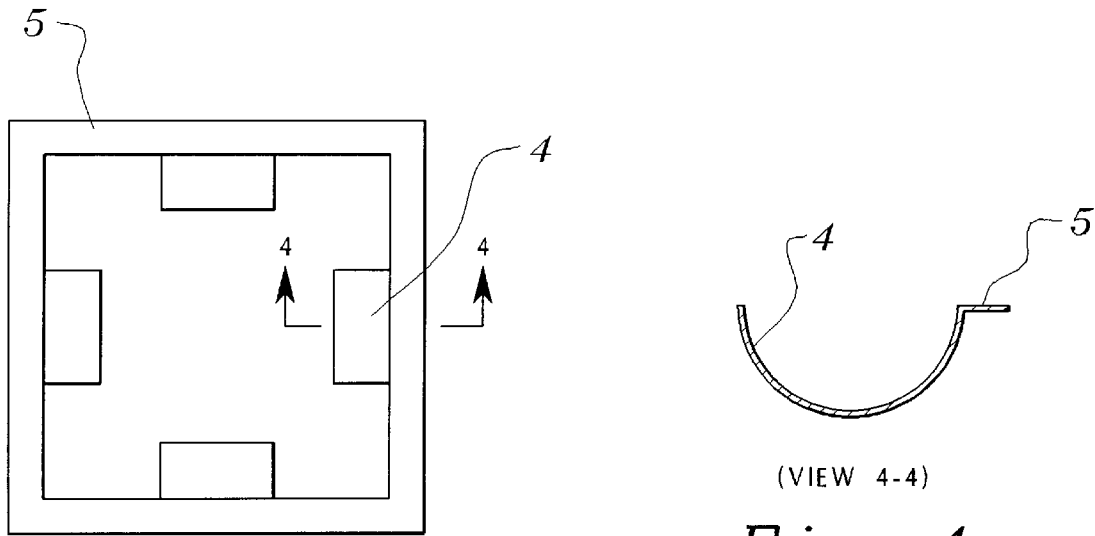
Fig. 3
Fig. 4 (VIEW 4-4)
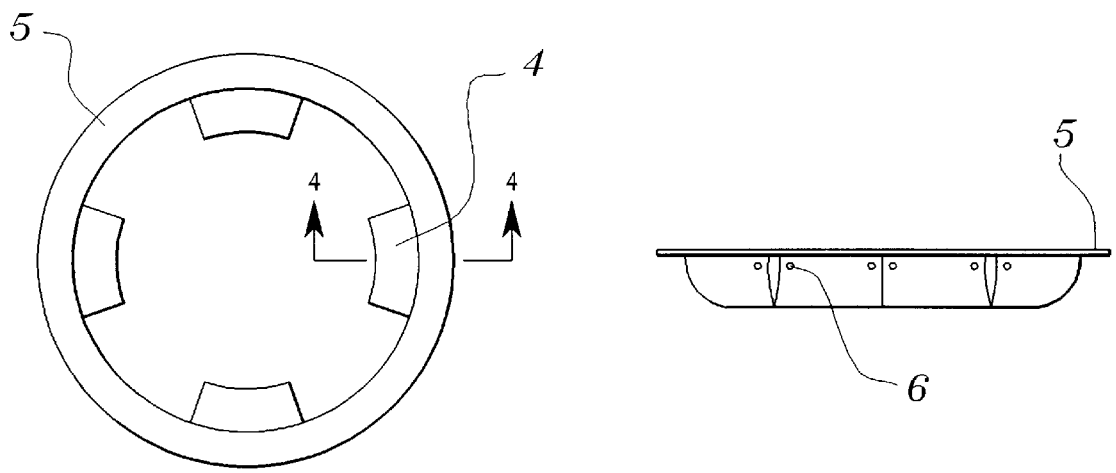
Fig. 5
Fig. 6

— 6,045,691 —

SEWER ECO-COLLAR FOR OPENING WITH COVERS

STATEMENT AS TO RIGHTS TO INVENTION MADE UNDER FEDERALLY SPONSORED RESEARCH AND DEVELOPMENT

None

BACKGROUND OF THE INVENTION

1) Field of the Invention

This application is in the field of storm water pollution prevention and regulatory compliance with new storm water requirements. The invention is targeted towards a multiple stage treatment of storm water contaminants for the removal of dissolved and liquid phase storm water contaminants through the use of absorbent socks as the primary treatment method and removal of particulate matter or other contaminants through the use of semi-permeable bags, which may be treated with special resins to retain such contaminants as soaps or nitrates, at the openings to storm water catch basins. The structure, sock and bags are located on the peripheral edge of the storm sewer catch basins which enables storm water to flow freely without encumbering the storm water flow nor the purpose of the storm sewer system.

2) Description of the Prior Art

Storm water collection and conveyance systems are well known and in widespread use to provide flood control and proper drainage. Numerous inventions in the field of storm water sewers and pollution prevention have been patented over the last century which can modify storm sewer catch basins to prevent pollution from discharging out of the storm sewer or provide a support mechanism for storm sewer catch basins.

U.S. Patent Documents

U.S. Pat. Nos.

| | | |
|---|---|---|
| 1,310,055 | 07/1919 Caldwell | |
| 4,419,232 | 12/1983 Amtyr, et. al. | 210/164 |
| 5,383,745 | 01/1995 Shannon | 210/164 |
| 5,632,888 | 05/1997 Chinn, et. al. | 210/164 |
| 797,585 | 08/1905 Kees | |
| 4,174,183 | 11/1979 Ferns | 404/26 |
| 4,188,151 | 02/1980 Hall | 404/26 |
| 5,632,889 | 05/1997 Tharp | 210/165 |
| 5,720,574 | 02/1998 Barella | 405/52 |

Foreign Patent Documents

| | | | |
|---|---|---|---|
| 1,275,277 | 05/1972 UK | Flegel | 210/165 |
| 114,257 | 06/1945 Sweden | Mattisson | 210/164 |

Caldwell (U.S. Pat. No. 1,310,055) developed a storm water treatment device, which was simply a strainer for catching large debris such as sticks, mud and leaves and allowing them to be broken up by storm water flows or removed from the system.

This device is ineffective, and indeed not intended to, remove fine particulate matter, dissolved and liquid phase contaminants. In fact, coarse material was intended to be broken up and enter the storm sewer system to prevent plugging of storm sewers, rather than being removed from the system. The technology employed is physical separation through straining. Furthermore, the device is located at the center of the storm sewer opening thus obstructing flow and does not employ similar treatment technology.

Amtyr, et.al. (U.S. Pat. No. 4,419,232) developed a two stage filtering and collection device for water drains. The first stage was a course strainer to remove wooden pegs and large objects, while the second stage was a fine mesh filtering bag, which had a primary purpose of removing finer particulate matter Such as sand and having limited capabilities of filtering out oils and other liquids to a certain extent. Furthermore, the device is located at the center of the storm sewer opening thus obstructing flow and does not employ similar treatment technology.

The disadvantage with this design is that dissolved impurities are not removed and liquid phase impurities are ineffectively removed by this filtration process. Furthermore, what liquid phase impurities and finer particulate matter removed by the filtering bag would be re-suspended during high flow conditions and either flow into the storm sewer system or back up and flood the drainage area. In fact, high storm water flows and water pressures would likely tear or otherwise destroy the filter bag. This design would severely limit storm water flow rates.

Shannon (U.S. Pat. No. 5,383,745) developed a Hazardous Materials Catch Basin, which does not treat storm water, but seals off hazardous materials from entering a storm sewer system. Spill containment catch basins are intended to contain a specific contaminant usually stored in bulk quantities at the site and is not intended to treat storm water pollution, but prevent the release of a spill material to the storm sewer. The spill containment catch basin specifically restricts or totally stops the flow of liquids in order to prevent the release of the contaminant of concern. These spill containment manholes are often inside buildings with bulk storage or specifically designed outside as spill containment units with little drainage area such that the diversion of storm water is not the primary concern of the unit. Furthermore, the device is located at the center of the storm sewer opening and requires fasteners and mechanical action to stop flows.

The disadvantage of this design is that storm water flows are severely restricted due to plugging with solids or the purposeful action of the unit to stop flows. Furthermore, only a specific contaminant is being targeted and the device is not intended to treat the liquid and dissolved phase contaminants in storm water. The device requires complex installation with fasteners and mechanical components.

Chinn, et. al. (U.S. Pat. No. 5,632,888 developed an environmental filter, which claims to remove solids by filtration by allowing water to run through a fabric type material over the opening. The aforementioned device is located centrally thus obstructing flow and does not employ similar treatment technology. Furthermore, the unit is located above the storm sewer opening and represents a slip, trip or fall hazard.

Kees (U.S. Pat. No. 797,585) developed a device, which was a tight fitting, water tight cover that could be converted to a ventilated cover to allow air exchange so that basements could be aired thoroughly. There is no provision for storm water pollution prevention claimed. Furthermore, the device is located at the center of the storm sewer opening.

Fems (U.S. Pat. No. 4,174,183) developed a device, which is a support frame for manhole covers and similar articles of highway furniture. There is no provision for storm water pollution prevention claimed. Furthermore, the device is located on the peripheral edge of the opening yet is intended to support highway furniture located at the center of the storm sewer opening.

Hall (U.S. Pat. No. 4,188,151) developed a device, which extends a manhole up such that when new asphalt, concrete or the surroundings are otherwise raised, the manhole can be raised such that it is level with the ground, road, or other surroundings and not beneath it. There is no provision for storm water pollution prevention claimed. Furthermore, the device is located on the peripheral edge of the opening yet is intended to support highway furniture located at the center of the storm sewer opening.

Tharp (U.S. Pat. No. 5,632,889) developed a device, which sits on the peripheral edge of a manhole to hold a specific environmental product; an absorbent filter media, in which water filters down through a perforated bottom such that water contacts the absorbent and hydrocarbons are selectively removed.

This device does not have the option of removing fine particulate matter and requires a deep trough to ensure contact with the absorbent as the flow of the storm water is down through the absorbent.

Barella (U.S. Pat. No. 5,720,574) developed a device, which sits on the peripheral edge of a manhole to hold a specific environmental product; an absorbent filter media, in which water filters down through a perforated bottom such that water contacts the absorbent and hydrocarbons are selectively removed.

This device does not have the option of removing fine particulate matter and requires a deep trough to ensure contact with the absorbent as the flow of the storm water is down through the absorbent.

Flegel—UK (Patent # 1,275,277) developed a device, which is interlocking framing and grating for trench drains. There is no provision for storm water pollution prevention claimed. Furthermore, the device is located at the center of the storm sewer opening.

Mattisson—Sweden (Patent # 114,257) developed a device, which is a frame for catch basins. There is no provision for storm water pollution prevention claimed. Furthermore, the apparatus is located on the peripheral edge of the opening yet is intended to support highway furniture located at the center of the storm sewer opening.

No prior inventions can treat the wide spectrum of storm water contaminants while ensuring that storm water drainage is maintained at the flows intended for in drainage designs. My invention is designed to employ absorbent technology by holding an absorbent sock only on the peripheral edge of the unit to remove liquid and dissolved contaminants and bags located between the troughs on the peripheral edge to collect particulate matter. No prior invention noted above or known to the Applicant employees both treatment technologies within the storm sewer catch basin opening. Furthermore, the prior art can not be easily adapted to hold sample bottles wherein sampling of storm water is now required as part of storm water permits nor do any of the prior inventions hold bags on the peripheral edge to the storm sewer opening.

Furthermore, there are devices noted above (Tharp and Barella) that hold absorbents on the peripheral edge of the storm sewer, but employ a perforated bottom such that storm water flows through the device. While my invention have a plurality of troughs that are impermeable to water and use the perimeter of the storm sewer to provide contact time with the absorbent material. Hence, the contact time with the absorbent sock with my invention would approximate the same removal efficiency as a device with a single trough and a perforated bottom that is much deeper. This alleviates the problems associated with installing a deeper trough involving obstructions within the catch basins or depth of the catch basin. Another problem associated with Tharp and Barella is that the one trough system filled with absorbent limits the amount of water that can contact the absorbent material as the porosity of the absorbent material and size of the perforations in their device would severely restrict flow, whereas my invention having a plurality of troughs and openings can accommodate much higher flow rates through the troughs and much more water would contact the absorbent material.

My invention being located at the top of the catch basin opening near the peripheral edge alleviates a major problem associated with other designs which are set further inside or are deeper involving removal and replacement of absorbents and bags. Ergonomics and safety considerations favor the bags and absorbent being located inches from the surface on the peripheral edge alleviating the need for reaching as far down or over in my invention versus these other designs.

Neither the Tharp (U.S. Pat. No. 5,632.889), Barella (U.S. Pat. No. 5,720,574) nor Amrtyr et. al. (U.S. Pat. No. 4,419, 232) is adaptable to holding a bag on the outside edge of the storm sewer catch basin as the entire periphery of the catch basin is occupied by the apparatus. Additionally, the placing of a bag on the outside edge reduces the stresses and forces on the bag such that tearing and destruction of the bag will not occur and water can flow freely through the unoccupied center portion. The bags in my invention would also be much lighter than the bag in the Amtyr invention as the openings are much smaller and the capacity of the bags could be much less than one bag extending over the entire opening.

SUMMARY

It is the purpose of this structure to provide a support mechanism for an absorbent socks and semi-permeable bags in such a way as to effectively remove storm water contaminants while permitting storm sewers to function as intended without impeding storm water flow into the storm sewer system. The apparatus utilize very simple principles to effectively treat storm water, while maintaining optimum flow rates in drainage systems. The structure is located on the peripheral edge of the storm sewer opening and sized to hold an absorbent sock which can remove dissolved and liquid phase contaminants.

The apparatus allows for flows that contain the greatest concentration of liquid and dissolved phase contaminants to contact the absorbents and thus be absorbed. As flows increase the storm water has already washed most of the liquid and readily dissolved impurities off the drainage area and has a much lower concentration of impurities. The majority of this storm water flows over the apparatus and absorbent sock simply due to the higher flows and greater velocity gradients and does not contact the storm water accomplishing a two-fold purpose. Firstly, this dilute storm water does not re-suspend nor wash our any of the contaminants captured by the absorbent and secondly, it allows for optimum flow of the storm sewer system as designed so no flooding will occur due to the apparatus.

Another purpose of the apparatus is to provide a frame to attach a bag, which not only captures fine particulate matter, but also allows storm water to back up. These bags, which can be impermeable or slightly permeable, by only spanning the distance between troughs overcome an obstacle to the use of bags in storm water openings by leaving the central portion of the storm sewer open and only spanning a short distance thereby reducing the stress and forces upon the bags. Henceforth in a circular designed unit there would typically be a plurality of bags spanning the distance and area between the troughs or similar support, which would not interfere with storm water flows.

Hence my apparatus has the purpose of removing a broad spectrum of dilute liquid and dissolved contaminants from storm water through the action of an absorbent material and collection of solid contaminants in a bag or bags while maintaining optimum drainage.

BRIEF DESCRIPTION OF THE DRAWINGS

The features, discussions and claims of my apparatus will become apparent from the drawings and following description and discussion.

FIG. 3 is the top view of the structure and would be the orientation of the structure looking down upon a typical rectangular storm sewer opening with troughs (4) to hold an absorbent sock in place and a lip (5) to rest on the catch basin frame. The cover is not shown, but when a catch basin cover is placed upon the structure it would provide further stability to hold structure and absorbent sock in place. The holes or slits to hold the bags in place can not be seen in this view.

FIG. 4 is the cross-sectional view of FIG. 3 & 5 showing how the structure has a thin lip (5) to allow the structure to rest on the same lip as the catch basin cover and showing the approximate shape of the troughs (4) though they are variable.

FIG. 5 is the top view of the structure and would be the orientation of the structure looking down upon a circular storm sewer catch basin opening. The troughs (4) or similar support to hold absorbent socks and spaces between the troughs are shown as well as the lip (5). The cover is not shown, but when a catch basin cover is placed upon the apparatus it would provide further stability to hold unit and absorbent sock in place.

FIG. 6 is a side view of FIG. 3 to further demonstrates approximate shape and size of troughs and how unit would be supported by a lip (5) on the frame for the cover and the holes (6) on the sides and end of each trough where the bags would be attached.

DESCRIPTION OF THE PREFERRED EMBODIMENTS

Figure 1:
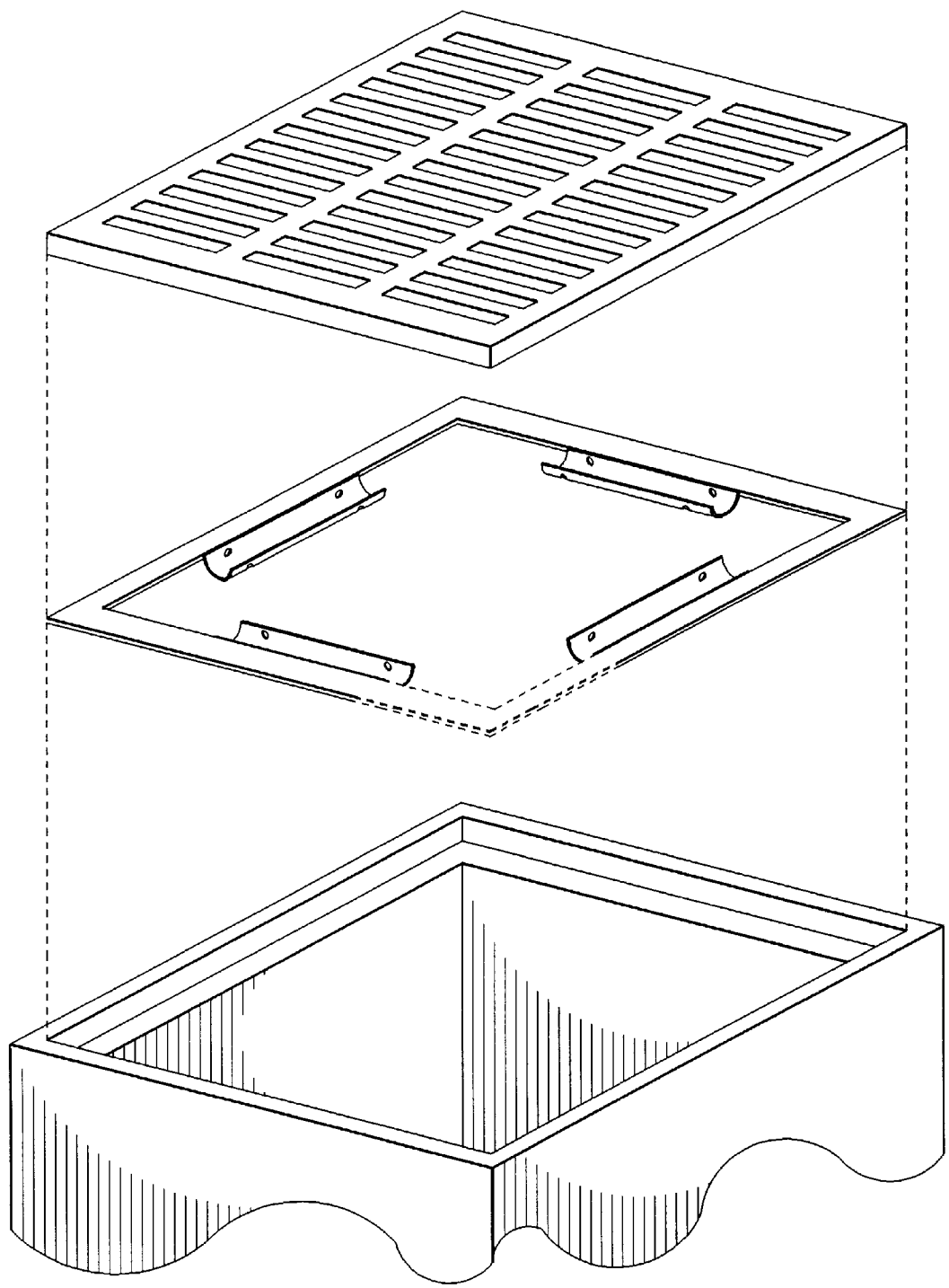
FIG. 1 is an exploded perspective view showing the structure between a typical rectangular storm sewer catch basin and the cover without the absorbent sock or bags in use.
Figure 2:
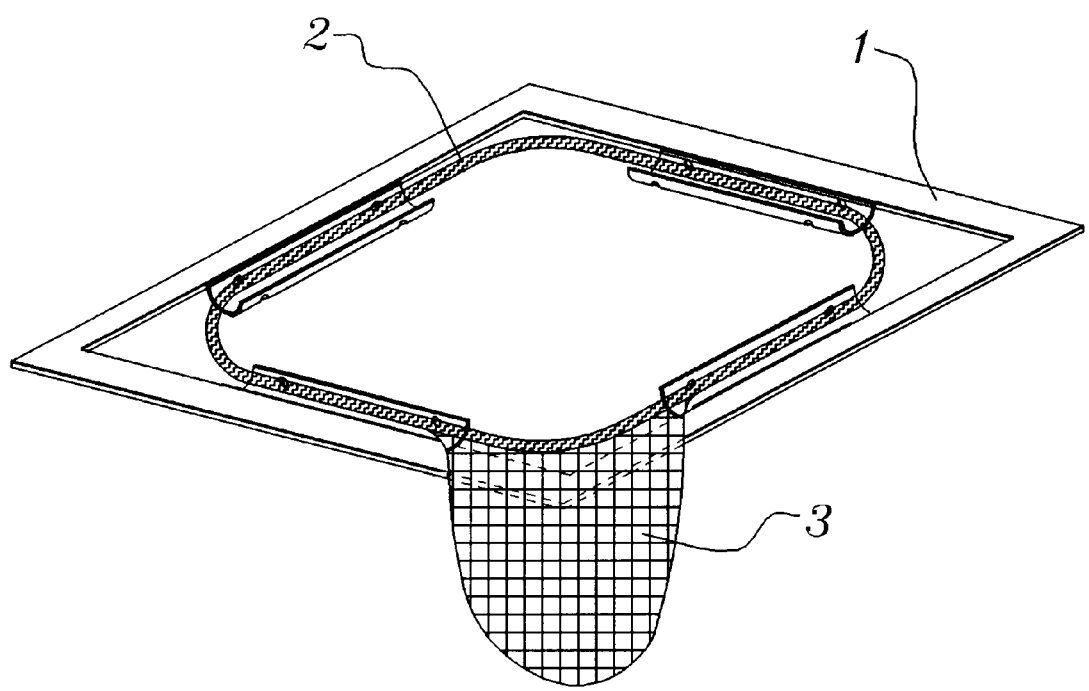
FIG. 2 is an exploded view of the apparatus (1) with the absorbent sock (2) and a bag (3) installed.

My invention provides a support frame that can be inserted into a storm sewer catch basin occupying the peripheral edge of the storm sewer opening and capable of holding an absorbent sock and bags on the peripheral edge of the storm sewer catch basin to remove liquid, solid and dissolved contaminants from storm water while allowing storm water to flow unimpeded.

Hence my invention slips into virtually any storm sewer opening without the need for fasteners or involving any complicated installation. The absorbent sock is then placed into the structure resting on the trough to remove liquid or dissolved phase storm water contaminants. Selection of the appropriate absorbent material is based upon the storm water of interest. For a storm water contaminant with nitrates, a paper based absorbent may be preferred since paper acts as a nitrogen sink and absorbs nitrates, which is a problem in the Chesapeake Bay area and other parts of the country. Parking lots in areas of little nitrate, which is common in many parts of the country devoid of farmland or yards, would be more compatible with an absorbent material specific to gas and oils. Therefore, the type of absorbent material is independent of the unit, since the unit can hold any absorbent sock.

The absorbent sock can be replaced whenever need and will remove a significant portion, but not all, of the liquid and dissolved phase contaminants. My invention is used to collect solids through bags attached to the structure. The point of attachment being located at each end of each trough and generally comprising a small hole, cut-out, or protrusion on both sides of the trough. Both of these environmental products would be located on the peripheral edge of the storm sewer opening.

What is claimed is:

1. An apparatus for insertion into a storm sewer catch basin comprising a recessed lip, a cover supported by said recessed lip, and an opening defining an inner peripheral edge, said apparatus comprising:

a frame connected to and supporting a plurality of troughs, said frame having a peripheral lip resting upon said catch basin recessed lip, said plurality of troughs located inwardly of said peripheral lip; and said plurality of troughs having an open top and adjacent open ends, and having a bottom and two sides which are impermeable to water; and a bag attached and extending from said adjacent open ends, wherein each said attached bag, and said plurality of troughs are within said catch basin opening defining said inner peripheral edge.

2. The apparatus of claim 1, wherein an absorbent sock is placed within said open tops of said plurality of troughs and supported by each trough.

3. The apparatus of claim 1, wherein the bags are semi-permeable.

* * * * *